United States Patent
Chao et al.

(10) Patent No.: US 7,598,595 B2
(45) Date of Patent: Oct. 6, 2009

(54) FABRICATION OF NANOPOROUS ANTIREFLECTION FILM

(75) Inventors: Kuei-jung Chao, Hsinchu (TW); Kuo-ying Huang, Taoyuan County (TW); Shu Fang Chen, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 168 days.

(21) Appl. No.: 11/453,932

(22) Filed: Jun. 16, 2006

(65) Prior Publication Data

US 2007/0141854 A1    Jun. 21, 2007

(30) Foreign Application Priority Data

Dec. 20, 2005    (TW) .............................. 94145290 A

(51) Int. Cl.
*H01L 21/31* (2006.01)
(52) U.S. Cl. ...................... 257/629; 257/642
(58) Field of Classification Search ................ 257/629, 257/642
See application file for complete search history.

(56) References Cited

U.S. PATENT DOCUMENTS

2003/0215626 A1* 11/2003 Hiller et al. ............... 428/304.4
2003/0232495 A1* 12/2003 Moghadam et al. ......... 438/623
2006/0269733 A1* 11/2006 Mizuno et al. ............ 428/304.4

OTHER PUBLICATIONS

T. Ohishi et al., Journal of Sol-Gel Science and Technology 8, pp. 511-515 (1997).
Yao Xu et al., Thin Solid Films 440 pp. 180-183 (2003).
D. R. Uhlmann et al., Journal of Non-Crystalline Solids 218, pp. 113-122, (1997).
Stefan Walheim et al., Jan. 22, 1999, vol. 283, Science www.science.org, pp. 520-522.
Dinguo Chen, Solar Energy Materials & Solar Cells 68 (2001) pp. 313-336.
Wark et al; Microporous and Mesoporous Materials 84 (2005), pp. 247-253.
Yao Lan-fang et al., Optical Instruments, vol. 26, No. 2, pp. 132-135, Apr. 2004.
Yao Lan-fang et al; Journal of Materials Science & Engineering, vol. 22, No. 4, pp. 502-504, Aug. 2004.

* cited by examiner

*Primary Examiner*—Alexander G Ghyka
(74) *Attorney, Agent, or Firm*—Birch, Stewart, Kolasch & Birch, LLP

(57) ABSTRACT

A nanoporous antireflection coating preparation method. A sol-gel precursor solution containing an organic template is coated onto a substrate. The sol-gel precursor solution containing the organic template is dried into a film. The organic template within the film is then removed to form a nanoporous antireflection coating. In preferred embodiments, the organic template is removed by $UV-O_3$ treatment at ambient temperature.

4 Claims, 5 Drawing Sheets

FABRICATION OF NANOPOROUS ANTIREFLECTION FILM

BACKGROUND OF THE INVENTION

1. Field of the Invention

The invention relates to an antireflection film and fabrication method thereof, and more particularly to a nanoporous antireflection transparent film and fabrication method thereof.

2. Description of the Related Art

The antireflection film is generally disposed on an outermost surface of an image display device such as polarizing film for a liquid crystal display (LCD), the front plate of a touch panel (PET substrate), the front plate of a projection television (PC substrate), the front plate of a cathode ray tube display or plasma display panel (glass substrate), or an optical lens, to reduce reflectance and prevent optical interference or image glare caused by external light and enhance the visibility of image.

The principle has been developed to suppress reflection and increase light transmission. It is the use of optical destructive interference. Antireflection films, working on the principle of destructive interference, have a film thickness (d) and a refractive index ($n_1$). For complete cancellation of the incident light reflection. Film thickness (d) must be one quarter of a wavelength ($\lambda$) of the incident light. Thus the equation is $d=\lambda/4n_1$.

A monolayer film can reduce the reflection of light at a single wavelength, but more often a multi-layered film comprising several transparent layers is used to reduce reflection over a wide wavelength region. Formation of this multi-layered film, however, requires a complicated process comprising a number of dry (such as vapor deposition or sputtering) and/or wet procedures (such as dip, spin, or print coating), increasing the cost of mass production. Thus, there has been increasing demand for a monolayer antireflection film with a simple fabrication process.

Recently, a monolayer antireflection film fabricated by a sol-gel process is described (particular for sol-gel techniques—see e.g., Uhlmann D. R. et al, Journal of Non-Crystalline Solids, 218 (1997) 113-122.). Ohishi T. (see J. of Sol-Gel Sci. and Tech. 8 (1997) 511-515.) discloses a method of forming a $SiO_2/SnO_2$ antireflection layer by spin-coating. Y. H. Sun discloses a method for forming silica nanoparticles deposited film with a thickness of 315~559 nm by dip-coating and spin-coating (see Thin Solid Films 440 (2003) 180-183.).

The obtained antireflection films fabricated by the aforementioned methods, however, comprise multilayer or aerogel silicon oxide with uncontrollable characteristics. Further, in the conventional methods, the porous $SiO_2$ film is formed by subjecting a $SiO_2$ sol coating to a thermal treatment at a temperature of 400-500° C. such that plastic substrates are damaged by excessive heat. Moreover, since the porous $SiO_2$ film is apt to adsorb moisture from the air, the refractive index thereof is increased with high relative humidity.

Therefore, it is necessary to develop a method for fabricating a nanoporous antireflection film to solve the previously described problems.

BRIEF SUMMARY OF THE INVENTION

The invention provides a method for fabricating a nanoporous antireflection film, comprising a substrate and preparing a precursor comprising organic template. A coating of the precursor is formed on the substrate and cured to form a film. The template is removed from the film to leave a nanoporous antireflection film.

In some embodiments of the invention, the coating of the precursor is formed on the substrate, and the template is removed from the film by $UV-O_3$ treatment or $UV-O_3$ combined with solvent extraction treatment to leave a nanoporous antireflection film. Further, before coating, the precursor is subjected to an aging treatment. The obtained nanoporous antireflection film can be subjected to the hydrophobic modification, maintaining the pore density in a specific range without being influenced by relative humidity.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
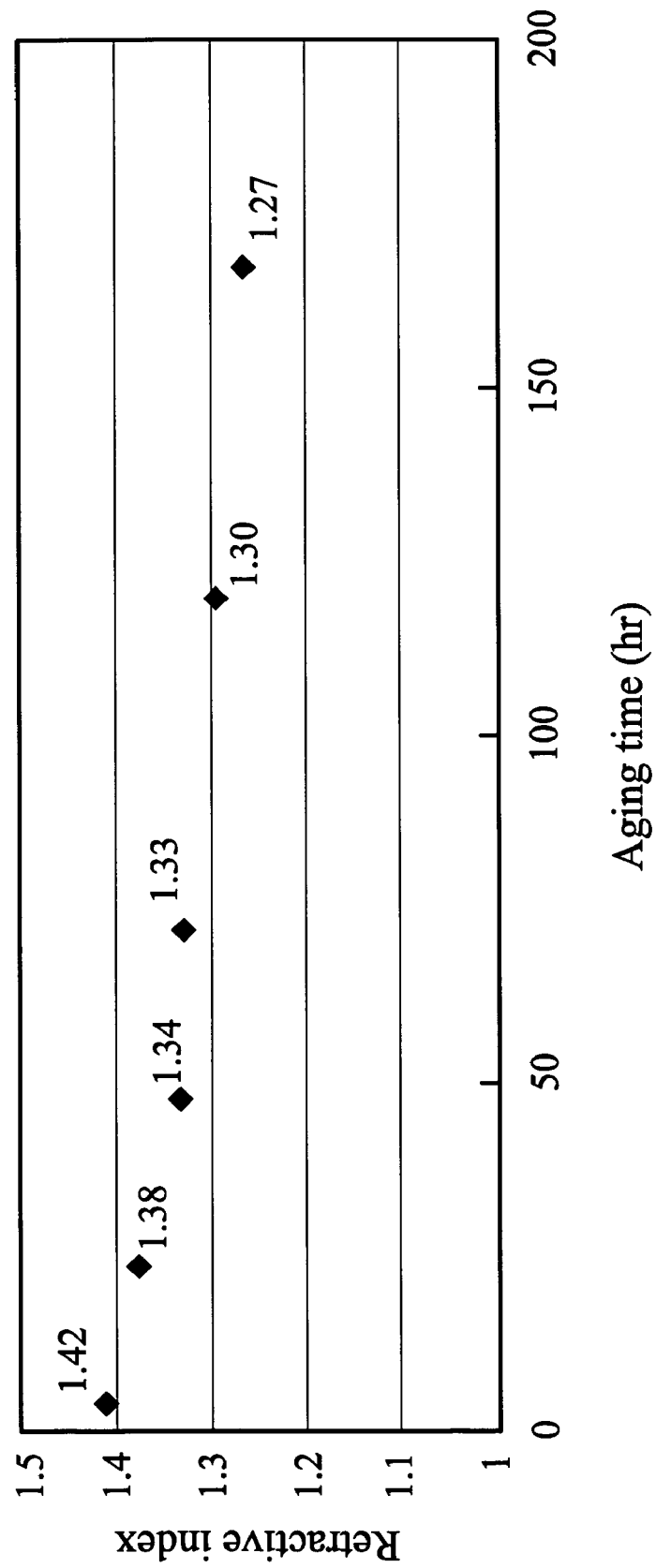
FIG. 1 is a graph plotting refractive indexes against duration of the aging treatment of the nanoporous antireflection films of Examples 1-6.

In some embodiments of the invention, the precursor can be coated on a substrate by dip-coating, and the organic template can be removed by $UV-O_3$ treatment or $UV-O_3$ at ambient temperature combined with solvent extraction treatment. Further, the nanoporous antireflection film can be subjected to the hydrophobic modification, thereby preventing the film from adsorbing moisture. The method for fabricating the nanoporous antireflection film of the invention has simplified steps. The obtained nanoporous antireflection film of the invention has a uniform nanopores distribution and superior properties due to the self assembly of the organic template.

In the method for fabricating the nanoporous antireflection films of this invention, a precursor is prepared. The precursor comprises metallic/metalloid salt or alkoxide, water, solvent, acid, and organic template. Wherein, the metal alkoxide comprises Ti-containing alkoxide, Zr-containing alkoxide, or Al-containing alkoxide. The metalloid alkoxide comprises Si-containing oxide, such as TMOS, TEOS, titanium tetraisopropoxide, titanium tetramethoxide, titanium tetraethoxide, titanium tetrabutoxide, and zirconium n-butoxide, the metalloid salt such as sodium silicate. The solvent can be alcohol, such as methanol, ethanol, iso-propanol, or n-propanol. The solvent also can be hexane, toluene, acetone, or ether. The acid can be organic acid or inorganic acid.

The-metalloid salt or alkoxide, water, solvent, and acid are mixed and refluxed for a period of time (e.g. heating to 50~100° C. for 60~120 minutes) before the addition of the organic template. The organic template can be ionic surfactant or nonionic surfactant, such as CTAB (Cetyltrimethylammonium bromide) ` Brij®56 ($C_{16}H_{33}(OCH_2CH_2)_{10}OH$) ` F127 ($OH(OCH_2CH_2)_{106}(CHCH_3{}_{CH2}O)_{70}(OCH_2CH_2)_{106}$) Tween 80 (polyoxyethylenesorbitan monooleate) ` Pluronic 123 (P123; $OH(OCH_2CH_2)_{20}(CHCH_3CH_2O)_{70}(OCH_2CH_2)_{20}$) or their combinations. Specifically, Pluronic 123 is a block copolymer and preferable among the above.

The molar ratio of metallic/metalloid salt or alkoxide, water, solvent, acid, and organic template can be 1:3~5:8~22:$10^{-5}$~0.3:0.001~0.1. After adding the organic template and stirring for 30~60 min, the mixture is subjected to an aging treatment for a period of time (more than 3 hours, preferably 4 hours~7 days). The refractive indexes of the resulting nanoporous films were found to be reduced with longer aging treatment time.

After the aging treatment, the precursor comprising the organic template is coated on a substrate to form a film, wherein the film is formed by spin coating or dip coating. Preferably, the precursor can be coated on the substrate by spin coating at a speed between 1500~5000 rpm. Experimentally, the coating formed by spin coating at a speed of 7000 rpm has a thickness of 140~180 nm. Further, the coating formed by dip coating has a preferable thickness of 113~155 nm. The coating is formed by dip coating with a pulling speed of not more than 10 cm/min, preferably between 1.0~10 cm/min, more preferably not more than 5 cm/min. In general, the thickness of mesoporous films has been found to be reduced with low pulling speed. It should be noted that, since the organic template can be removed at ambient temperature, the material used for the substrate can be silicon wafer, glass, plastic substrate or polymer optical film.

After baking at 80~110° C. for 1~3 hours, the organic template of the coating is removed by calcination at 350~550° C. for 2~8 hours or UV—$O_3$ treatment. Since the plastic or polymer substrate would be damaged by calcination treatment of temperature more than 250° C., the organic template of mesoporous films would be removed by UV—$O_3$ treatment or UV—$O_3$ at ambient temperature combined with solvent extraction in this invention. With solvent extraction, the organic template can be removed by UV—$O_3$ treatment of less than 0.5 hr instead of 1-5 hr. The employed solvents are alcohol, ketone, alkane or their combinations. The solvent can be further modified by adding ionic salts or acidic reagents. The nanoporous antireflection films produced by template removal at room temperature with hydrophobic modification have lower refractive indexes than that obtained by calcination at 400° C. with subsequent hydrophobic modification.

Since the template molecules are apt to be uniformly distributed in the channels of a nanoporous film, in a specific arrangement such as a honeycomb by self assembly. The nanoporous antireflection film has a plurality of nanopores with a uniform diameter of 2-10 nm after removing the template.

The template-removed film can be subjected to a hydrophobic modification. In embodiments of the invention, the antireflection film is subjected to the hydrophobic modification with hexamethyldisilazane (HMDS) vapor at 80-160° C. for less than 90 minutes or solution, or other silanes.

The nanoporous antireflection film of the invention, with a thickness in the range of 110~150 nm, exhibits reflectivity less than 10%, preferably less than 5%, a refractive index of 1.2-1.5, and a transmittance of more than 90%, preferably more than 95%. The nanoporous antireflection film can be formed by simplified process and has superior stability after being subjected to the hydrophobic modification.

The following examples are intended to demonstrate this invention more fully without limiting its scope, since numerous modifications and variations will be apparent to those skilled in the art.

EXAMPLES 1-6

14.172 g of TEOS, 3.866 g of $H_2O$, 0.334 ml of HCl(1N), and 30.66 g of ethanol were added into a bottle. After refluxing at 70° C. for 90 min, 3.866 g of P123 ($OH(OCH_2CH_2)_{20}(CHCH_3CH_2O)_{70}(OCH_2CH_2)_{20}$) dissolved in 30.66 g of ethanol was added into the bottle and stirred for 30 min. The obtained mixtures were subjected to aging treatment for 4 hours (Example 1), 1 day (Example 2), 2 days (Example 3), 3 days (Example 4), 5 days (Example 5), 7 days (Example 6) to prepare precursors for Examples 1-6.

Then, a precursor was coated on glass substrate (in the size of 4 cm×4 cm~6 cm×6 cm) by spin coating at a speed of 5000 rpm. After baking at 110° C. for 3 hours, the sample was calcined at 400° C. for 2 hours, to remove the organic template (P123) therefrom. Then, the obtained antireflection film was subjected to the hydrophobic modification with hexamethyldisilazane (HMDS) vapor at 150° C. for 1 hr.

The refractive indexes of antireflection films were measured by a n & k spectrophotometer. Referring to FIG. 1, the refractive index of the nanoporous antireflection film is reduced with longer aging time.

EXAMPLES 7~9

The precursor of Example 5 was coated on glass substrates by dip coating with pulling speed of 1 cm/min (Example 7), 2 cm/min (Example 8), or 3 cm/min (Example 9). After baking at 110° C. for 3 hours, the obtained coatings were calcined at 400° C. for 2 hours, to remove the organic template (P123) therefrom. Then, the obtained antireflection films were subjected to the hydrophobic modification with hexamethyldisilazane (HMDS) vapor at 150° C. for 1 hr The refractive index and thickness of the antireflection films of Examples 7-9 were measured by a n & k spectrophotometer and shown in Table 1.

TABLE 1

|  | pulling speed (cm/min) | thickness (Å) | refractive index (at 550 nm) |
|---|---|---|---|
| Example 7 | 3.0 | 1302 | 1.29 |
| Example 8 | 2.0 | 1287 | 1.30 |
| Example 9 | 1.0 | 1211 | 1.26 |

EXAMPLES 10-12

A precursor of Example 6 was coated on glass substrate by dip coating with a pulling speed of 1 cm/min (Example 10), 2 cm/min (Example 11), or 3 cm/min (Example 12). After baking at 110° C. for 3 hours, the coatings were calcined at 400° C. for 2 hours to remove the organic template (P123) therefrom. Then, the obtained antireflection films were subjected to the hydrophobic modification with hexamethyldisilazane (HMDS) vapor at 150° C. for 1 hr.

The refractive index and thickness of antireflection films of Examples 10-12 were measured by a n & k spectrophotometer and shown in Table 2.

TABLE 2

|  | pulling speed (cm/min) | thickness (Å) | refractive index (550 nm) |
| --- | --- | --- | --- |
| Example 10 | 3.0 | 1314 | 1.31 |
| Example 11 | 2.0 | 1307 | 1.27 |
| Example 12 | 1.0 | 1204 | 1.25 |

As show in Tables 1 and 2, the thickness of the nanoporous antireflection films by dip coating is in the range of 1200-1300 Å and has been found to be reduced with decreasing pulling speed.

EXAMPLE 13

The precursor of Example 5 was coated on glass substrates by dip coating with pulling speed of 1 cm/min. After baking at 110° C. for 3 hours, the obtained coating was subjected to a UV—$O_3$ treatment for 2 hours to remove the organic template (P123) therefrom. Then, the obtained antireflection film was subjected to a hydrophobic modification with hexamethydislazane (HMDS) vapor at 150° C. for 1 hr.

The refractive index and thickness of the antireflection film of Example 13 were observed to be 1.24 and 971 Å respectively measured by a n &k spectrophometer. In comparison with Example 9 (possessing a thickness of 1211 Å and refractive index of 1.26), the nanoporous antireflection film formed by UV—$O_3$ treatment is thin and of low value in refractive index.

Figure 2:
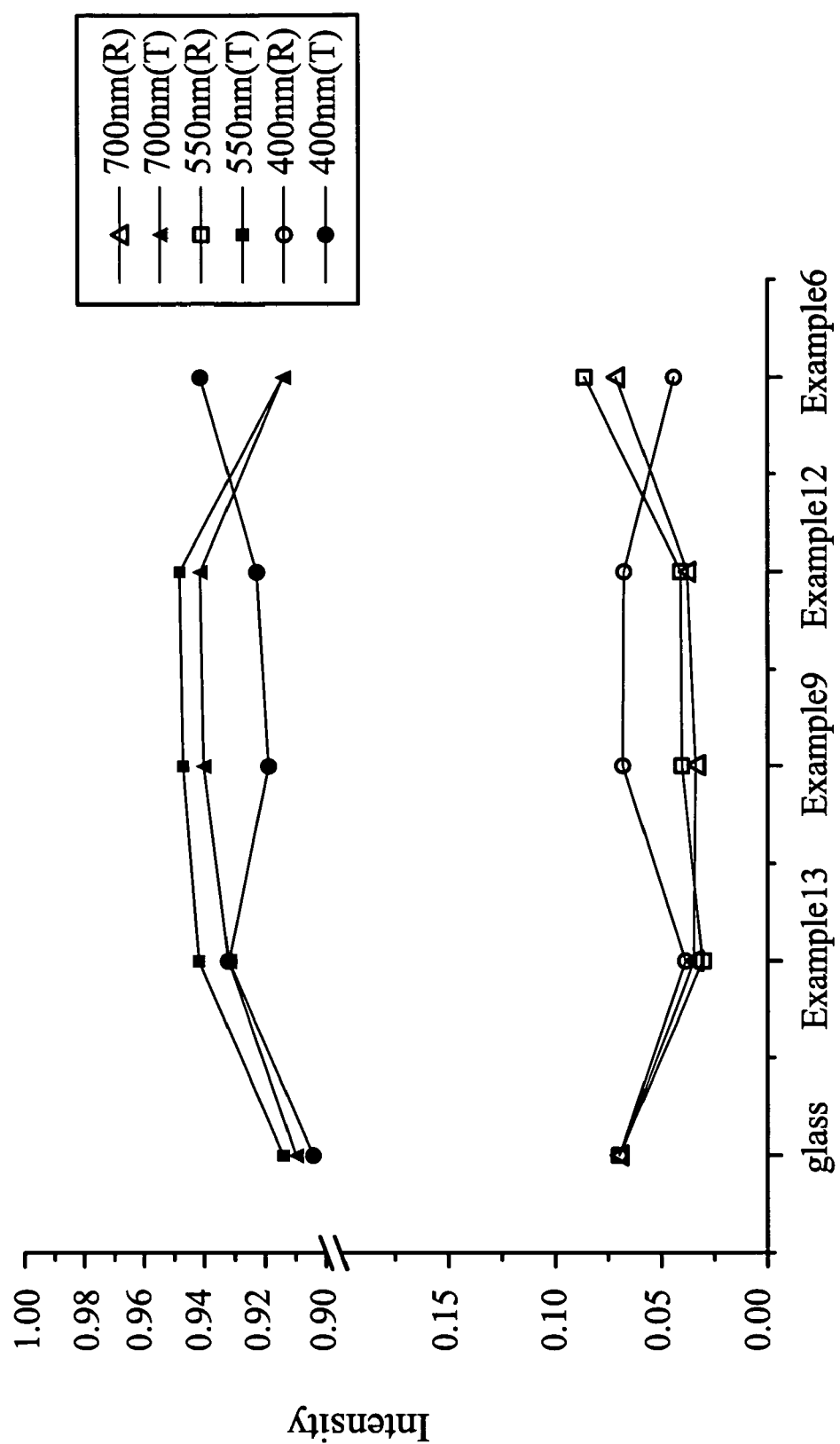
FIG. 2 is a graph plotting reflectivity and transmittance of the nanoporous antireflection films of Examples 6, 9, 12, and 13.

Table 3 and FIG. 2 show the reflectivity (R) and transmittance (T) of antireflection films of Examples 6, 9, 12, and 13, measured at wavelengths of 400 nm, 550 nm, and 700 nm.

TABLE 3

|  | R(700) | T(700) | R(550) | T(550) | R(400) | T(400) | thickness(Å) |
| --- | --- | --- | --- | --- | --- | --- | --- |
| Glass substrate | 0.07234 | 0.91201 | 0.07214 | 0.91599 | 0.07046 | 0.90568 | 700 μm |
| Example 13 | 0.03531 | 0.93567 | 0.03136 | 0.946 | 0.03981 | 0.93486 | 971 |
| Example 9 | 0.03516 | 0.94466 | 0.03853 | 0.95047 | 0.06958 | 0.92056 | 1211 |
| Example 12 | 0.0387 | 0.9446 | 0.04132 | 0.95273 | 0.06725 | 0.9256 | 1204 |
| Example 6 | 0.07171 | 0.91869 | 0.08509 | 0.91677 | 0.04592 | 0.94412 | 2293 |

Accordingly, the antireflection films of the invention have low reflectivity and high transmittance at visible light (of wavelength=400-700 nm). Most likely, it is due to the application of UV—$O_3$ treatment to remove the organic template as in Example 13.

Figure 3:
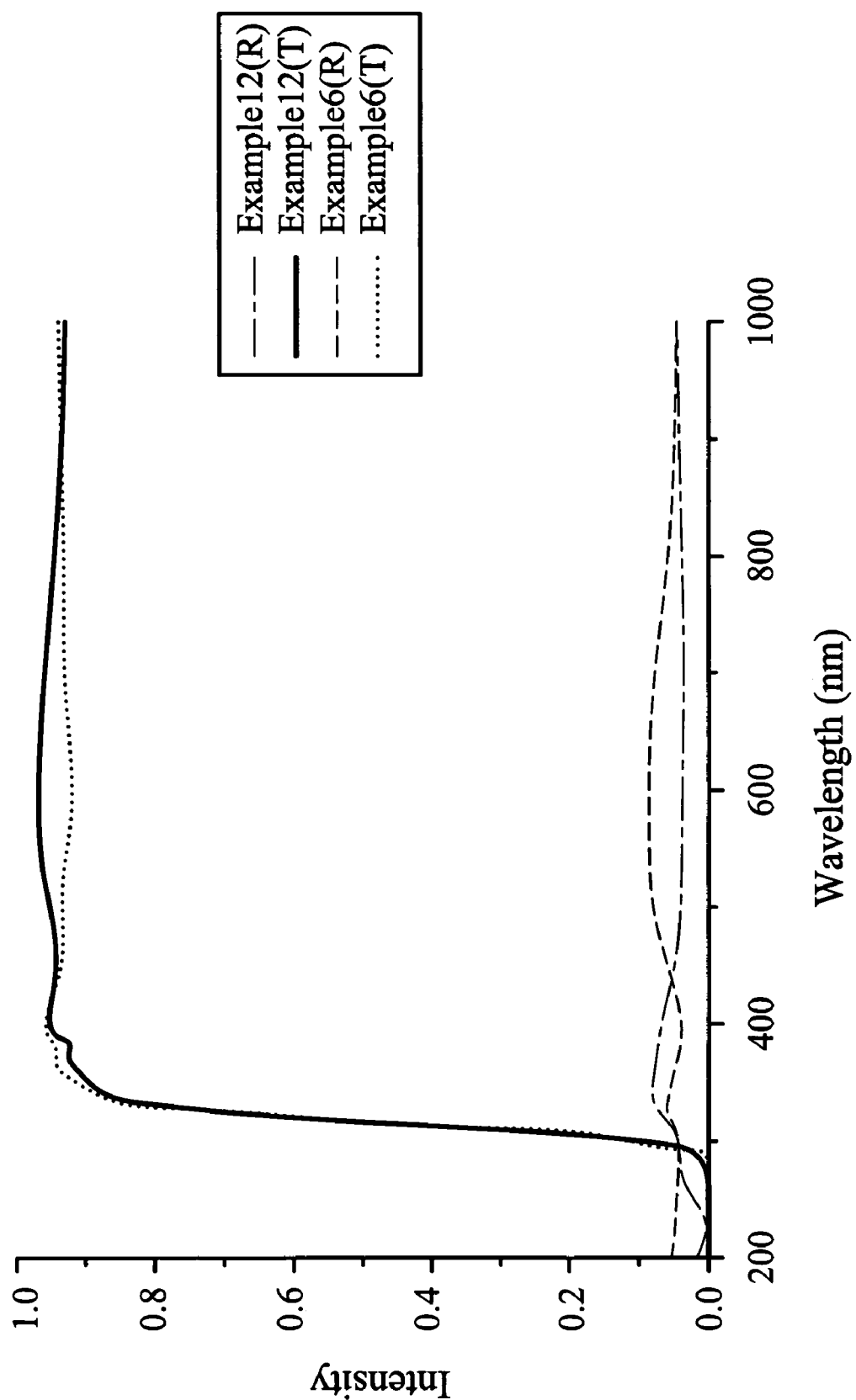
FIG. 3 is a graph plotting reflectivity and transmittance against light wavelength of the nanoporous antireflection films on glass substrate of Examples 6 and 12.

Referring to FIG. 3, the antireflection films formed by dip coating and spin coating possess different reflectivity and transmittance.

EXAMPLE 14

Figure 4:
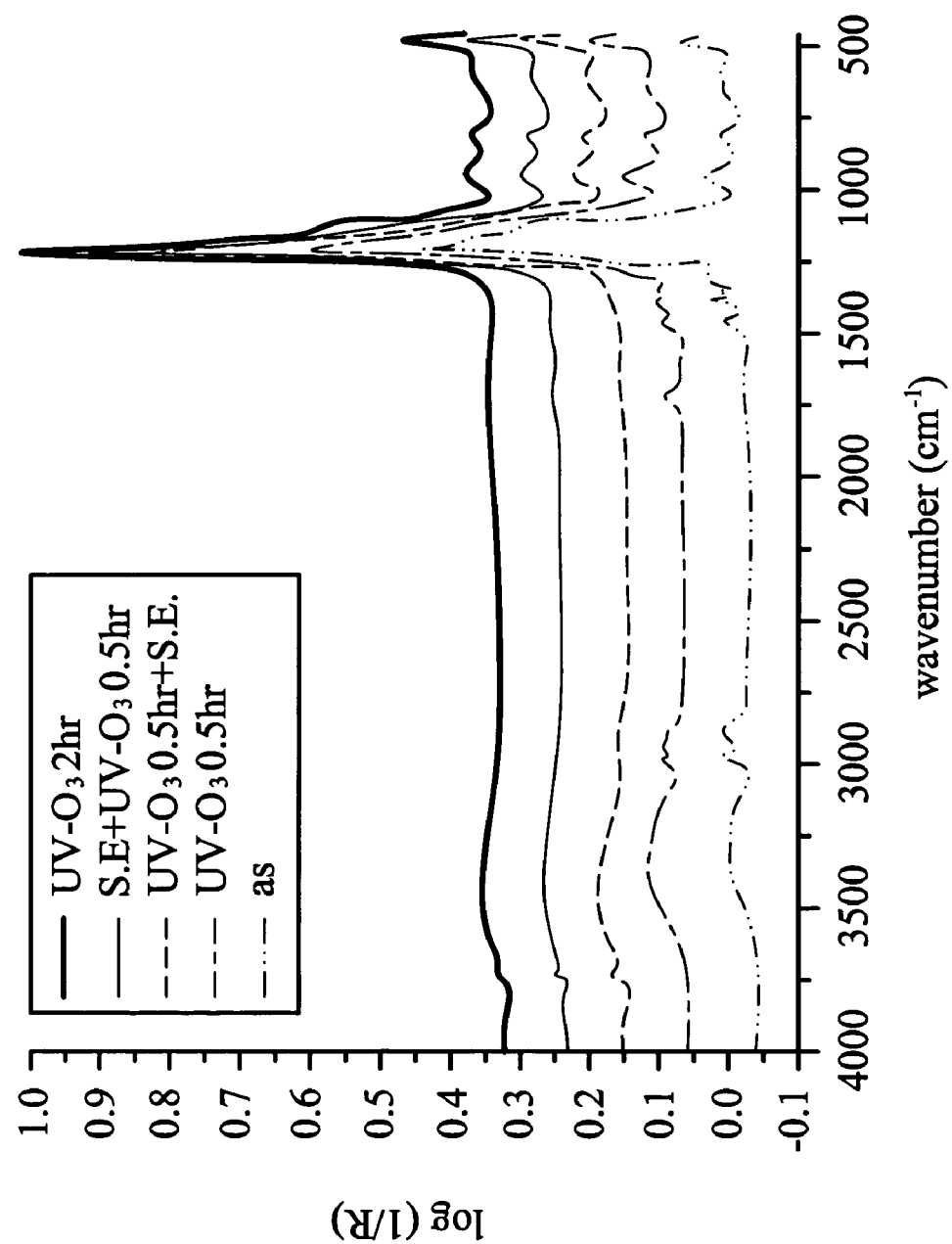
FIG. 4 shows IR spectra of nanoporous silica films after organic removal treatments. A coated (AS) mesoporous film on glass was treated by $UV-O_3$ treatment for 2 hr ($UV-O_3$ 2 hr) or $C_2H_5OH$ solvent extraction with subsequent $UV-O_3$ treatment for 0.5 hr (S.E.+$UV-O_3$ 0.5 hr) or $UV-O_3$ treatment for 0.5 hr with subsequent $C_2H_5OH$ solvent extraction ($UV-O_3$ 0.5 hr+S.E.).

FIG. 4, shows IR spectra of nanoporous films after UV—$O_3$ treatment and the combination of UV—$O_3$ treatment with solvent extraction. The efficiency of organic removal of UV—$O_3$ treatment at room temperature for 2 hr is similar to that of UV—$O_3$ treatment for 0.5 hr with solvent extraction. The refractive indexes of nanoporous films produced by HMDS treatment after 0.5 hr UV—$O_3$ treatment, $C_2H_5OH$ solvent extraction with subsequent UV—$O_3$ treatment for 0.5 hr, 0.5 hr UV—$O_3$ treatment with subsequent $C_2H_5OH$ solvent extraction, or UV—$O_3$ treatment for 2 hr are 1.38, 1.10, 1.10 and 1.12.

EXAMPLES 15~16

Figure 5:
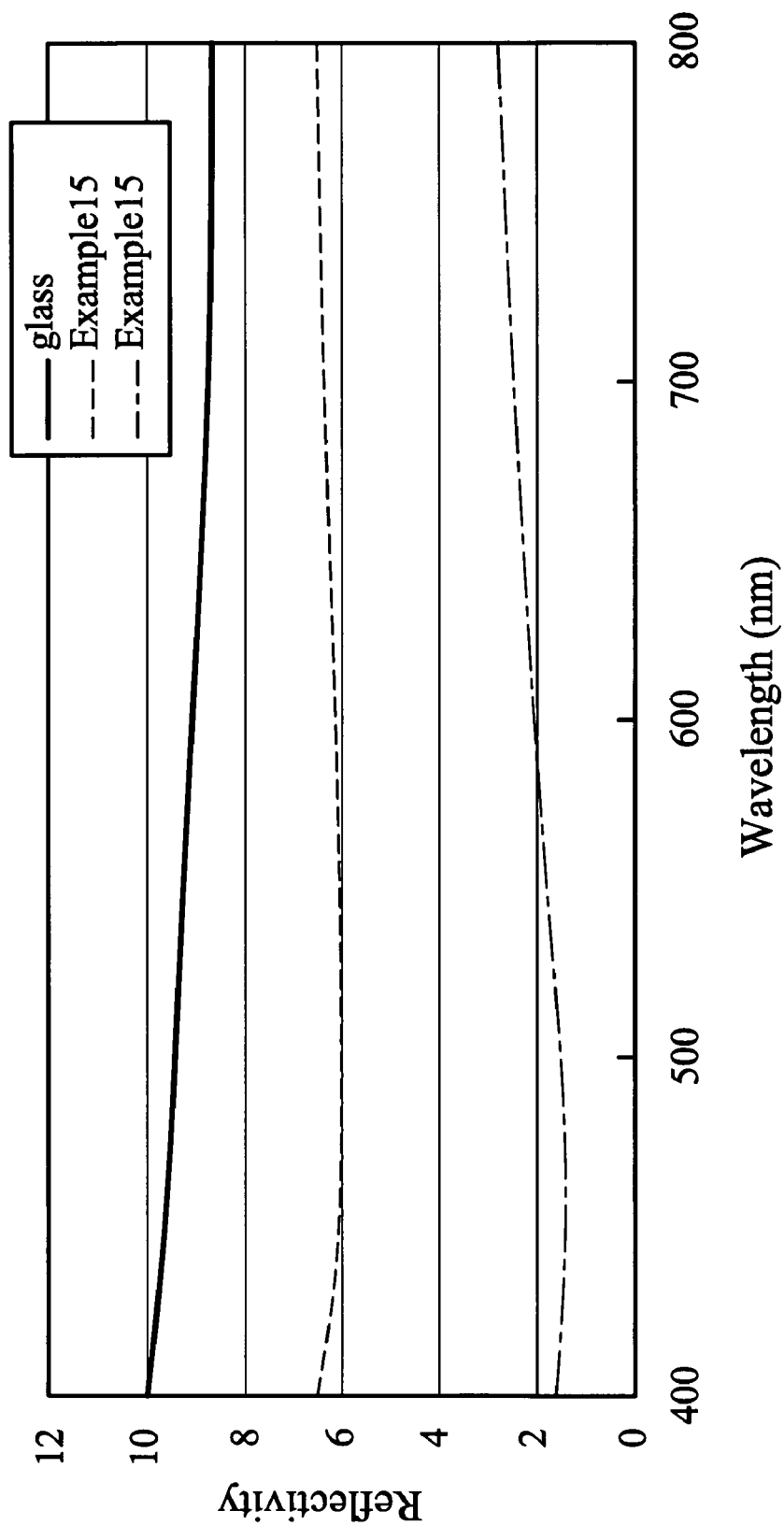
FIG. 5 is a series of plots of reflectivity against light wavelength on a glass substrate and nanoporous antireflection films on glass substrates of Examples 15 and 16.

Examples 15 and 16 were performed as Example 13 except for the substitution of 4×4 $cm^2$ substrate for 5×5 $cm^2$ substrate, wherein the non-coating surface of the substrate in Example 15 is opaque. The reflectivity of the antireflection films of Example 15-16 was measured from 400 to 700 nm by Perkin Elmer-Lambda 900, as shown in Table 4 and FIG. 5.

TABLE 4

|  | glass | Example 15 | Example 16 |
| --- | --- | --- | --- |
| Minimum reflectivity | 8.5 | 1.48 | 5.98 |
| Average reflectivity | 8.9 | 2.05 | 6.21 |
| Average transmittance | 91.2 | — | 93.6 |

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A nanoporous antireflection film, which is fabricated by a method comprising the following steps:
   providing a substrate;
   preparing a precursor comprising organic template and a metallic/metalloid salt or alkoxide;
   forming a coating of the precursor on the substrate;
   curing the coating, thereby forming a film; and
   removing the template from the film to leave a nanoporous antireflection film;
   wherein the antireflection film has a reflectivity of less than 10% and a transmittance of more than 90%.

2. The film as claimed in claim 1 which has a thickness between 1.2~1.5.

3. The film as claimed in claim 1 which has a thickness between 110~150nm.

4. The film as claimed in claim 1, which has a plurality of uniformly distributed nanopores.

* * * * *

UNITED STATES PATENT AND TRADEMARK OFFICE
CERTIFICATE OF CORRECTION

PATENT NO. : 7,598,595 B2  Page 1 of 1
APPLICATION NO. : 11/453932
DATED : October 6, 2009
INVENTOR(S) : Chao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 280 days.

Signed and Sealed this

Twenty-eighth Day of September, 2010

David J. Kappos
*Director of the United States Patent and Trademark Office*